Feb. 20, 1940. C. E. L. LIPMAN Re. 21,364
REFRIGERATOR
Original Filed July 18, 1932 2 Sheets-Sheet 1
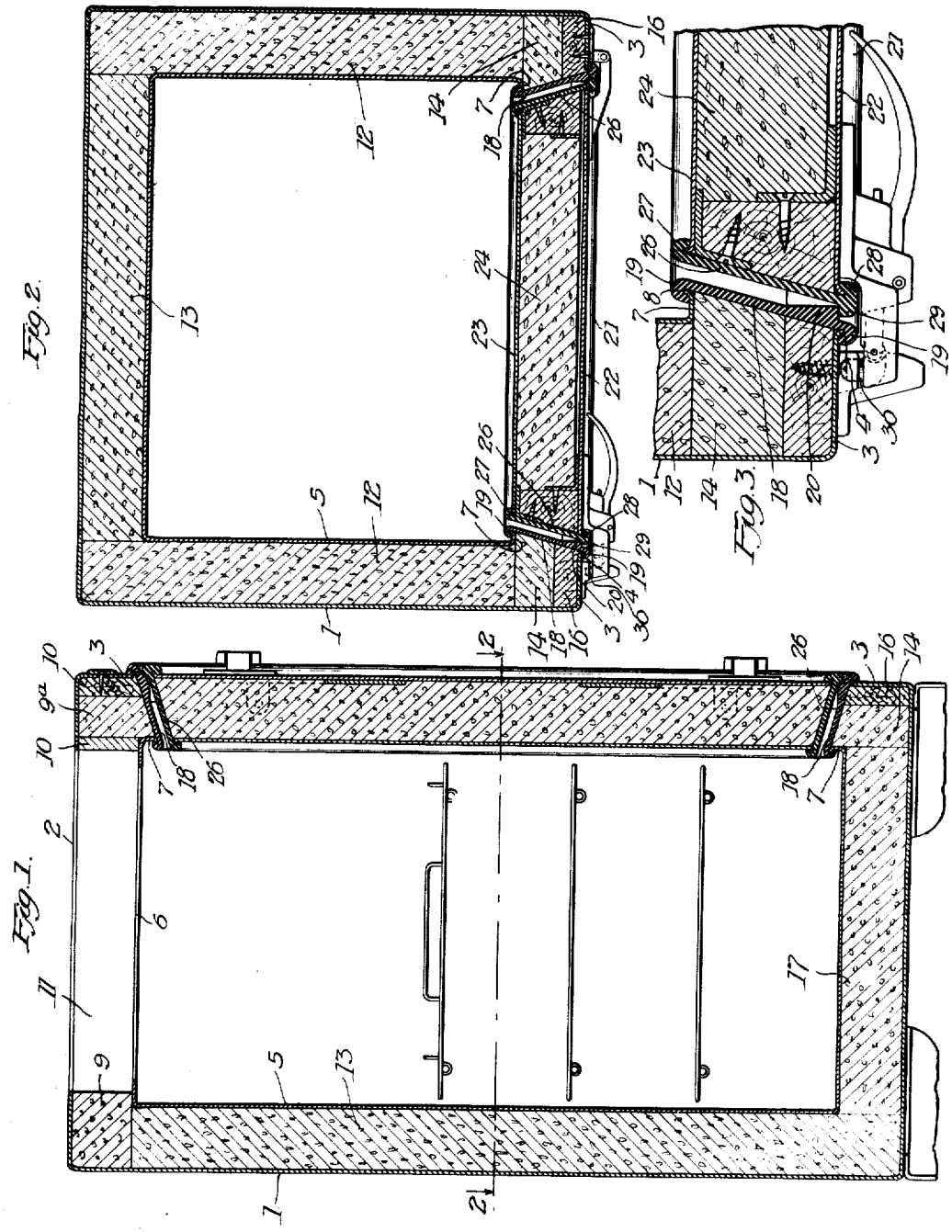
Inventor:
Carl E. L. Lipman
Witness:
R. B. Davison
By: Wilson, Dowell, McCanna & Rehm
Attys.

Feb. 20, 1940. C. E. L. LIPMAN Re. 21,364

REFRIGERATOR

Original Filed July 18, 1932 2 Sheets-Sheet 2

Inventor:
Carl E. L. Lipman:

Witness:
R. B. Davison.

By: Wilson, Dowell, McCanna & Rehm
Attys

Reissued Feb. 20, 1940

Re. 21,364

UNITED STATES PATENT OFFICE 21,364

REFRIGERATOR

Carl E. L. Lipman, Kenilworth, Ill., assignor, by mesne assignments, to Will Freeman, Chicago, Ill.

Original No. 2,076,821, dated April 13, 1937, Serial No. 623,078, July 18, 1932. Application for reissue October 24, 1938, Serial No. 236,828

8 Claims. (Cl. 220—9)

This invention relates to refrigerator cabinets and more particularly to those constructed of sheet metal. Cabinets of this type comprise a sheet metal casing surrounding and spaced from an inner sheet metal shell or lining, both casing and shell having aligned door openings, and the space between the casing and lining being filled with insulation.

It can readily be appreciated that these metallic shells increase the difficulties of assembling and of providing proper insulation, particularly at the door openings where the casing and lining are connected and sealed by some means. Heretofore the edges of the casing and lining have been flanged inwardly toward each other and a breaker strip secured over the inturned flanges. This construction, however, not only places the metal casing and lining edges, which are good heat conductors, in close proximity to each other but places them in the doorway between the door and the door opening outside of the refrigerated compartment and in heat conductive relation thereto.

It is the purpose of this invention to provide an improved sheet metal cabinet which, in addition to having structural advantages and being so constructed as to be readily and economically assembled with a minimum amount of labor, provides for adequate insulation throughout the entire box and especially at the door openings, and provides a door seal.

In accordance with this invention, the outer casing and inner lining are formed each of a single sheet of metal or of separate sheets assembled and so constructed as to permit insertion of the lining into the casing through the door opening of the latter. The insulation is so sectioned as to permit ready insertion thereof between the casing and lining partly before and partly after inserting the lining into the casing. Furthermore, a novel preferably unitary removable and replaceable combination breaker strip and sealing strip is employed to connect the casing and lining together around the door openings and to provide a seal for the door.

A better understanding will be had of my invention from the following description given in connection with the drawings in which:

Fig. 1 is a longitudinal vertical section through a cabinet constructed in accordance with this invention;

Fig. 2 is a section taken approximately on line 2—2 of Fig. 1;

Fig. 3 is an enlarged detail section through the cooperating sealing strips.

Figure 4:
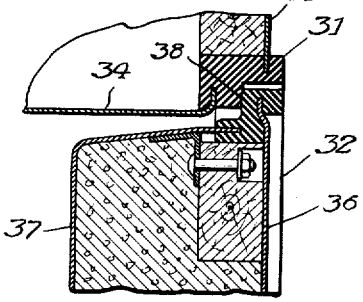
Figs. 4 to 10, inclusive, are partial sections through the front wall and doors of modified forms of construction, each figure representing a slightly different form of this invention.

As can be seen from the drawings, the refrigerator cabinet comprises an outer rectangular sheet metal casing 1 having an opening 2 in the top wall thereof through which the refrigerating unit may be inserted and a door opening through the front thereof defined by a flange 3 terminating in a slightly hooked edge 4. Within the casing 1 is a lining or inner shell 5 which forms the refrigerating compartment. The inner lining is also provided with an opening 6 through the top wall thereof which is aligned with opening 2 and with a door opening in the front thereof defined by a flange 7, parallel to flange 3 and terminating in a hooked edge 8.

The inner lining 5 is small enough to permit the lining to be inserted through the doorway of the outer casing. The lining is of course spaced from the outer shell and the space therebetween is filled with insulation. The insulation is so sectioned into slabs and strips as to permit ready assembly of the insulation and of the entire cabinet. The space between the top of the lining and the top of the casing is filled with a rear strip of insulation 9, and a front strip 9a, the latter being faced on each side by strips 10 of wood, composition or other suitable material. Two side strips 11 complete the insulation of the top of the cabinet. The strips 8, 9, 9a and 11 are arranged around the periphery of the cabinet so as to leave a central opening through which the refrigerating unit may be inserted. The space between the side walls of the casing and lining is filled with slabs or panels 12 which extend to the back wall of the casing but not to the front wall thereof. The chamber between the back walls is filled by a slab 13 which lies between the two side panels 12 and holds the latter in place. The space between the two flanges 3 and 7 is filled by strips 14 faced with strips 16 of wood or other suitable material. The space between the bottom walls is filled by a panel 17 which lies between the rear panel 13 and the front lower strip 14 holding the latter in place.

The casing and lining are secured and sealed together at the door openings by a rectangular shaped frame-like breaker strip 18 of some flexible, preferably elastic, thermal insulating material such as rubber. In the construction shown in Figs. 1, 2 and 3, this combined breaker strip and sealing strip comprises a rectangular frame-like member of integral or sectional structure, the marginal edges of which terminate in inturned hooks or flanges 19 which interlock and grip the hooked edges 4 and 8 of flanges 3 and 7. The strip is also provided with a thickened abutment portion 20, which serves as a door stop as will be hereafter described. The breaker strip may be formed entirely of soft rubber or it may be formed of semi-hard or hard rubber having a soft or elastic portion sufficient to enable the strip to be stretched over and interlocked with the edges 4 and 8 of flanges 3 and 7 which define the door openings through the casing and lining respectively.

The doorway, outlined and defined by strip 18, is closed by a door 21 composed of an outer plate 22 and an inner plate 23 corresponding to the outer casing and inner shell or lining of the cabinet, the space therebetween being filled by a slab of insulation 24. The marginal edges of the metal door sides are joined and sealed by a breaker strip 26 generally similar to strip 18 and which is preferably formed of rubber and is provided with hooked marginal edges 27 and 28 which interlock and embrace the edges of plates 22 and 23. Strip 26 is also provided with a bead 29 projecting from the front edge thereof in such a manner as to engage the abutment 20 when the door is closed. The two strips 18 and 26 therefore not only serve as sealing and breaker strips for the casing and lining and door panels but also serve as a sealing strip or gasket for the door. The door is hinged in the usual manner along one vertical edge and is secured in closed position by any suitable latch which preferably includes a door stop, such as a rubber bumper 30, to relieve the sealing and breaker strips of carrying the entire shock.

In Fig. 4 there is shown a slightly modified form of breaker and sealing strips which may be said to be under compression rather than under tension as on the other forms. The cabinet strip 31 is substantially L-shaped in section and is provided with grooves or slots in opposite faces thereof into which the marginal edges of the casing 33 and lining 34 project, the strip being under compression and thereby held in place. The door strip 32 is substantially Z-shaped in section and is provided with a pair of grooves formed in intersecting faces to receive the outer and inner panels 36 and 37, respectively, of the door. When the door is closed the two strips contact at 38 and provide a door seal or gasket as well as breaker and seal for the cabinet and lining.

Figure 5:
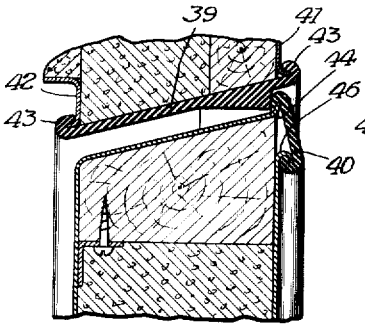

In Fig. 5 there is shown another form of cooperating breaker and sealing strips 39 and 40 for the cabinet and door respectively. In this form the door opening flanges 41 and 42 of the casing and lining, respectively, terminate in curved edges and the breaker therefor is identical to strip 18, i. e. the strip is provided with curved marginal edges 43 which extend inwardly to provide a pair of grooves to receive curved edges of door opening flanges 41 and 42.

The door is formed in a somewhat similar manner, that is, the door opening flanges are curved as at 44 and 46, the former flange being extended across the edge of the door in proximity to the front face thereof. The breaker and sealing strip 40 is hooked over the two flanges 44 and 46 in a manner similar to strip 39 to seal the inner and outer panels of the door. This strip also contacts an abutment portion formed on strip 39 to provide a door seal.

Figure 6:
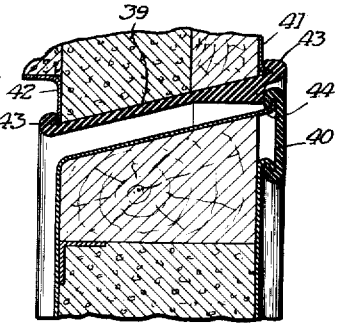

In Fig. 6 there is illustrated a pair of breakers and sealing strips similar to that shown in Fig. 5 with the exception that flange 44 is extended outwardly a little farther beyond the door in order that the sealing strip 41 may be parallel to the door face.

Figure 7:
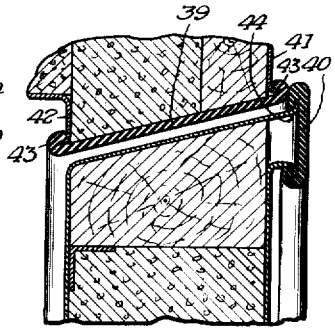

In Fig. 7 the illustrated breaker and sealing strips are substantially the same as shown in Figs. 5 and 6 with the exception that the strip 41 on the door seals against the outer hooked edge of strip 39 instead of a special thickened portion thereon.

Figure 8:
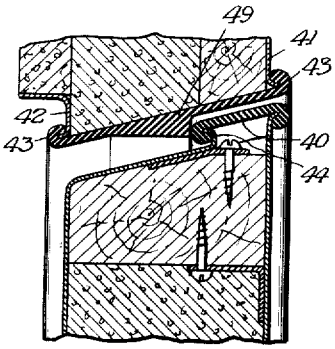

In Fig. 8 there is illustrated a slightly further modified form of cabinet breaker and sealing strip 49 which is similar to strip 39 with the exception that the thickened abutment portion is disposed at approximately the center of the width of the strip. The door construction is further modified so that the flanges of the door panels terminate approximately in the plane of the door edge rather than the plane of the door face. The door breaker strip 41 is similar to that shown in Figs. 5 and 7 but due to the formation of the door lies parallel to strip 49 rather than to the face of the door.

Figure 9:
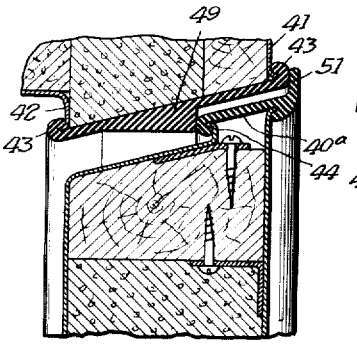

In Fig. 9 the cabinet breaker strip is similar to that shown in Fig. 8 as is the door strip 41*a*, the latter however is provided with a flange 51 which engages the forward edge of strip 49 whereby a double seal is provided.

Figure 10:
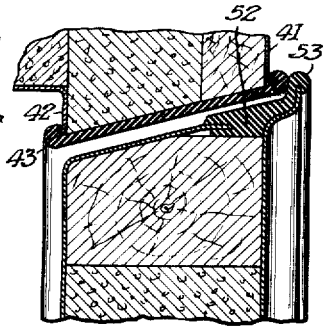

In Fig. 10 the cabinet breaker strip is similar to that shown in Fig. 7 but the door breaker strip 52 is of different configuration to conform with the modified door panel structure and is provided with a slot in one edge to receive the inner door panel and a hooked flange 53 to receive the margin of the front door panel. In this instance the front door panel is provided with a curved marginal rim and the strip is similarly shaped to lie thereagainst.

In assembling a refrigerator cabinet, constructed as heretofore described, the outer casing is first set up and the rear top insulation strips 9 and 9*a* and the side strips 11 are inserted. Side panels 12 are then placed in position followed by the rear panel 13 after which the lower panel 17 is laid in place. The inner lining is then inserted through the doorway after which the front strips 14 and their facings 16 are inserted. The cabinet and lining is then ready to be secured together and sealed by the combined breaker and sealing strip 18 which is stretched over the inturned edges 4 and 8 of flanges 3 and 7 of the doorways in the casing and lining respectively. The door is of course assembled separately and then installed. From the foregoing it will be apparent that the matter of assembling a box, constructed as previously described, is very simple. Substantially no nailing or screwing is required which materially decreases the labor. It is also apparent that the sealing strips constitute a breaker strip which permits wide separation of the metallic portions of the cabinet, namely the casing and lining, and in the preferred form also eliminates any metallic conductive paths between the edge of the door and the door opening through the cabinet as is customary in the standard constructions in which the outer casing and lining are carried into proximity at the door openings and covered by a breaker strip. In my construction, particularly in the preferred form, there are no metal or heat conductive parts disposed between the door and the door opening through the cabinet. Furthermore a readily removable and replaceable unitary breaker strip is provided which not only serves as a breaker and sealing strip between the metallic parts of the cabinet and door but serves as a sealing strip or gasket for the door. The terms casing and lining are used broadly to mean the outer and inner walls of either the cabinet proper or the doors to the refrigerator.

It is obvious that minor changes may be made in the details of construction without departing from the spirit and scope of this invention as defined in the appended claims.

I claim:

1. A refrigerator having spaced inner and outer metallic walls provided with a door opening, a door in said opening having spaced inner and outer metallic walls, a pair of non-heat conducting elastic breaker and sealing strips disposed in inter-engaging locking relation with the spaced walls of the cabinet and door, respectively, and covering the space between the respective inner and outer walls, said cabinet and door strips having opposed abutting surfaces adapted when the door is in closed position to cooperate in forming a seal between the cabinet and door.

2. A refrigerator having spaced inner and outer metallic walls provided with a door opening, a door in said opening having spaced inner and outer metallic walls, a pair of non-heat conducting elastic breaker and sealing strips disposed in inter-engaging locking relation with the spaced walls of the cabinet and door, respectively, and covering the space between the respective inner and outer walls, said cabinet and door strips having a plurality of abutment surfaces adapted when the door is closed to cooperate with companion abutment surfaces of the opposed strip to form a plurality of seals between the cabinet and door.

3. A refrigerator cabinet having spaced inner and outer metallic walls provided with a door opening, the edges of said walls surrounding said opening being bent to form oppositely projecting hooks, and an elastic breaker and sealing strip shaped to interlockingly engage with said hooks and form a connection between said walls at the door opening.

4. A refrigerator cabinet having spaced inner and outer metallic walls provided with a door opening, a door therefor having spaced inner and outer metallic walls, the edges of said cabinet and door walls in proximity to said opening being bent to form oppositely projecting hooks, an elastic breaker and sealing strip shaped to interlockingly engage with said hooks on the cabinet walls and form a connection between said walls at the door opening, and an elastic breaker and sealing strip shaped to interlockingly engage with the hooks provided by the walls of the door, the opposed strips on the cabinet and door being provided with abutment surfaces adapted to be brought into cooperative relation upon the closing of the door to form a seal between the cabinet and the door at said opening.

5. A refrigerator cabinet provided with a door comprising an inner wall having an edge portion, an outer wall spaced from said inner wall and also having an edge portion, heat insulation between the walls, another wall formed of flexible material provided with tongues which form grooves to engage said edge portions, said latter wall forming a closure for the space between said inner and outer walls, and a gasket seal flexibly connected to said wall of flexible material to provide an air-tight seal between the inside and the outside of the cabinet.

6. A refrigerator cabinet having a storage chamber therein provided with a door for closing the chamber, said door comprising an inner wall having an edge portion, an outer wall spaced from said inner wall and also having an edge portion, heat insulation between the walls, a breaker strip forming another exposed wall member and providing a closure for the space between said inner and outer walls, said breaker strip being provided with at least one flexible tongue near an edge thereof in which a groove is formed to engage the edge portion of one of said walls, means for fastening the other edge of the breaker strip to the other wall, and a gasket seal flexibly and integrally connected to said breaker strip to provide an air-tight seal for said storage chamber when the door is closed.

7. A refrigerator cabinet provided with a wall structure comprising an inner metal wall having an edge portion, an outer metal wall spaced from said inner metal wall and also having an edge portion terminating in widely spaced relation to the edge portion of said inner metal wall, said edge portions of said walls defining a door opening in said wall structure, the edge portion of one of said walls being bent to form a hook extending therealong, a breaker strip composed at least in part of resilient rubber and having a substantially flat wide main body portion bridging the gap between the spaced apart edges of the metal walls and forming a closure for the space therebetween, said rubber part of said strip being provided with an integral flexible portion projecting outwardly from the main body portion thereof near one of its edges and forming a groove to interlockingly engage the hook along the edge of said one metal wall, said rubber part of said strip also being provided with an integral flexible portion projecting outwardly from the main body portion thereof near the other of its edges and adapted to interlockingly engage the edge portion of the other metal wall to form a connection between said walls at the door opening.

8. A refrigerator cabinet having a storage chamber therein provided with a door for closing the chamber, said door comprising an inner metal wall having an edge portion, an outer metal wall spaced from said inner wall and also having an edge portion, heat insulation between said walls, the edge portion of one of said metal walls being bent to form a hook extending therealong, a breaker strip composed at least in part of resilient rubber and having a substantially flat wide main body portion bridging the gap between the spaced apart edges of the metal walls and forming an exposed closure for the space therebetween, said rubber part of said strip being provided with an integral flexible portion projecting outwardly from the main body portion thereof near one of its edges and forming a groove to interlockingly engage the hook along the edge of said one metal wall, said rubber part of said strip also being provided with an integral flexible portion projecting outwardly from the main body portion thereof near the other of its edges and adapted to interlockingly engage the edge portion of the other metal wall to form a connection between said door walls, and a flexible gasket seal formed integral with said rubber part of said strip and adapted to engage the refrigerator cabinet to provide an air-tight seal for said storage chamber when the door is closed.

CARL E. L. LIPMAN.